A. E. FELDMAN.
CARRIER FOR SPARE TIRES.
APPLICATION FILED SEPT. 13, 1918.
1,325,083.
Patented Dec. 16, 1919.
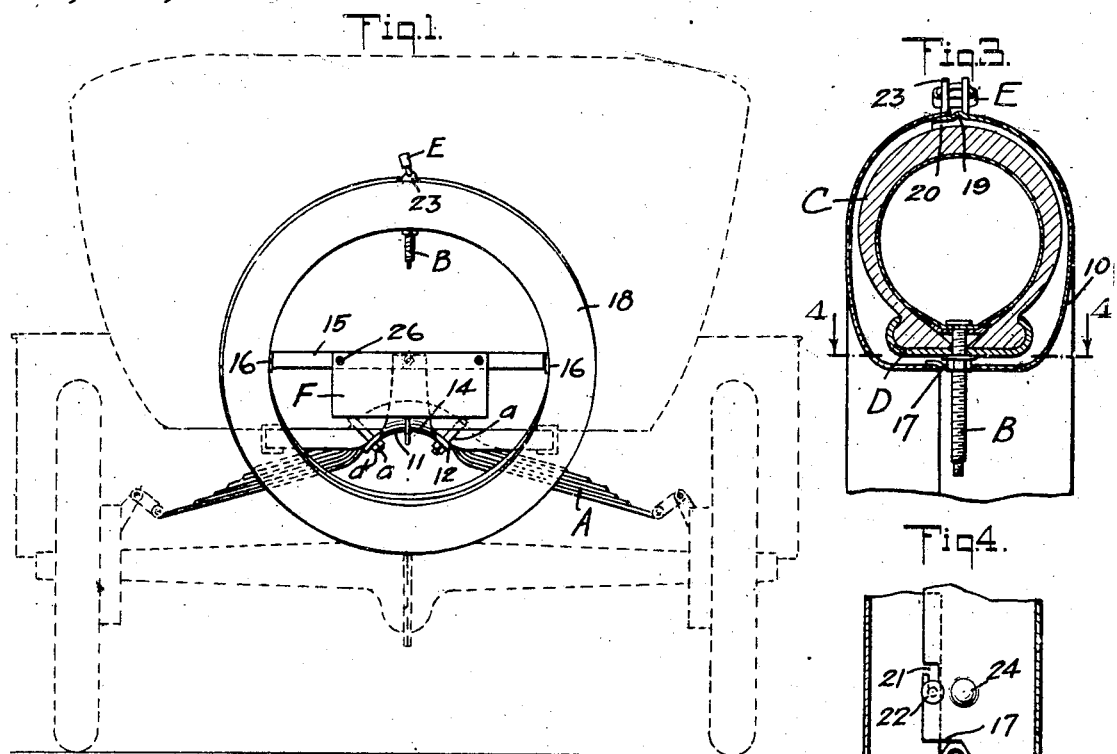
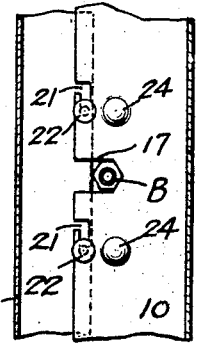
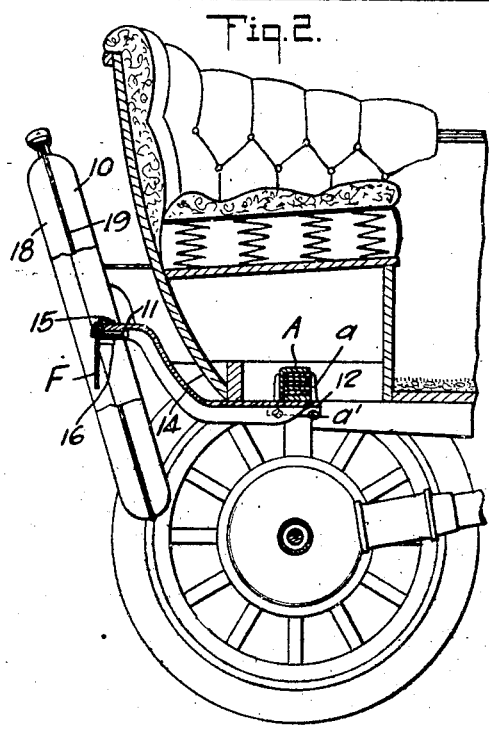
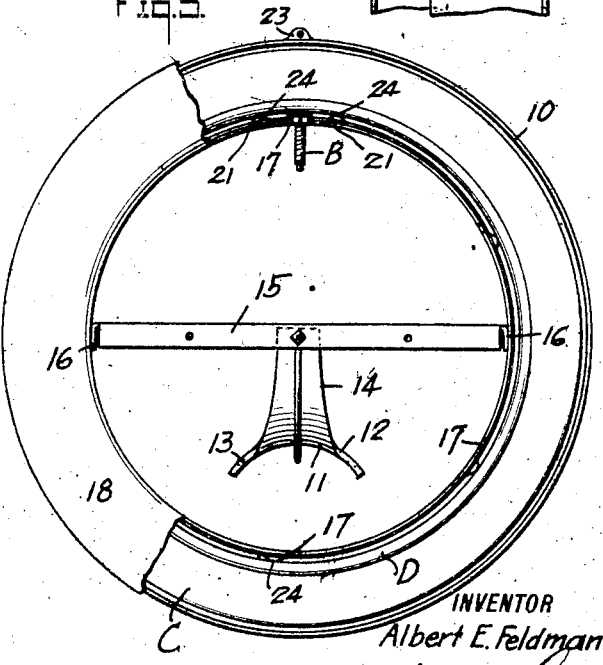
WITNESSES
Frederick Diehl.
INVENTOR
Albert E. Feldman.
BY
ATTORNEYS

UNITED STATES PATENT OFFICE.

ALBERT E. FELDMAN, OF BROOKLYN, NEW YORK, ASSIGNOR TO ALMETL ACCESSORIES CORPORATION, OF BROOKLYN, NEW YORK, A CORPORATION OF NEW YORK.

CARRIER FOR SPARE TIRES.

1,325,083.

Specification of Letters Patent.

Patented Dec. 16, 1919.

Application filed September 13, 1918. Serial No. 253,886.

*To all whom it may concern:*

Be it known that I, ALBERT E. FELDMAN, a citizen of the United States, and a resident of the city of New York, borough of Brooklyn, in the county of Kings and State of New York, have invented a new and Improved Carrier for Spare Tires, of which the following is a description.

My invention relates to means for carrying one or more spare tires on an automobile.

General objects of my invention are to provide a tire holder and carrier of the indicated character that will completely house the tire and thereby fully protect the same, and to provide a novel cover for the holder having fastening means permitting the cover to be readily fastened or unfastened.

The stated objects and others as will appear are attained by a carrier of annular form to receive and accommodate the tire or tire and rim, said carrier including a body adapted to be secured in fixed position on an automobile at the sides or back as desired, or as may be necessary by reason of the particular type of the automobile; the said annular casing body has an open front closed by an annular cover attachable to and detachable from the casing body by a relative turning movement of the cover about the axis of the casing, and the said relatively fixed casing body has members in the material thereof at the interior for centering the tire and facilitating its removal without binding in the casing, said centering means serving moreover to prevent rattling of the spare tire and its rim in the casing.

Further distinctive features and advantages will appear as the description proceeds.

Reference is to be had to the accompanying drawings, forming a part of this specification, it being understood that the drawings are merely illustrative of one example of the invention.

Figure 1 is a front view of the tire holder applied.

Fig. 2 is a view partly in section and partly in side elevation of a tire holder embodying my invention, illustrating the same applied to an automobile shown in part;

Fig. 3 is an enlarged cross section of a tire holder;

Fig. 4 is a detail in horizontal section on the line 4—4, Fig. 3;

Fig. 5 is a separate front elevation of the carrier partly broken away.

In carrying out my invention in accordance with the illustrated example, an annular tire body 10 is provided, approximately concavo-convex in cross section. Said body may be supported by suitable brackets or other supporting means fixed to the automobile at the back or sides according to where the holder is to be positioned. In the illustrated form of my invention, which is particularly adapted to automobiles of a known type, a rear bracket is provided which is designated as a whole by the numeral 11. Said illustrated bracket includes a base plate 12 formed with bolt holes 13 therein at the ends to receive the shackles or clips *a* of the rear spring A of an automobile, whereby to be fastened in position at the under side of the axle by nuts *a'* of the clips. The base plate 12 in the form shown, is curved longitudinally to conform to the particular type of axle illustrated. An upstanding member 14 extends from the base plate 12 and to the upper end of said member is secured or on it is formed an elongated transverse bar 15, preferably an angle bar. The bar 15 has a length to extend across the casing body 10 within the same adjacent to the center. One flange of the angle bar 15 extends beyond the other at the ends of the bar and said ends 16 are bent to lie against the surface of the casing body 10 at the opposite sides and rigidly fastened in any suitable manner to the casing body.

It will be obvious from the foregoing that the bracket may be quickly secured to the axle of the automobile and will thereby position the bracket and the casing body at the rear of the automobile and also that said casing is firmly braced by the bar 15. A transverse slot 17 is formed in the casing body 10 either at the inner or outer peripheries, to accommodate the valve B of a tire C, the tire shown being carried by a tire rim D.

An annular cover 18, approximately semicircular in cross section, completes the casing and is detachable from the body 10. It will be observed that the casing body at the outer periphery has a bead 19 thereon inward from the front edge thereof, said body thereby presenting at its outer periphery an annular flange 20 to receive the opposed edge of the cover 18, the bead serving to limit the movement of the cover onto the body 10. In the casing 10 at each side of the slot 17 are bayonet slots 21 to receive pins 22 on the cover, whereby the cover may be passed onto the body axially of the latter and then given a relative turning movement to secure the cover. Obviously, also, the reverse movement of the cover will serve to detach the same from the body 10. The cover and casing have ears 23 to receive a lock E. At the interior of the body 10 at spaced intervals therearound protuberances 24 are produced by being pressed therein or otherwise, whereby to center the tire and its rim in the casing body and to prevent binding of the tire in the casing when being removed. Two of the protuberances 24 are advantageously disposed at opposite sides of the slot 17 to facilitate the positioning of the tire as the tire valve is entered in the slot 17 and others are disposed at intervals about the body 10.

In manufacturing my improved carrier the body and the casing are separately stamped up from sheet metal and the illustrated bracket may be similarly formed from sheet metal. The number plate F of the automobile is secured by any suitable fasteners 26 to the cross bar 15. Thus, the bar serves to support the number plate in a conspicuous position.

By providing for the complete detachment of the cover, durability is promoted as compared with a hinged cover which will sag, owing to the large size of the cover, and will be damaged by blows or careless handling, to which in the ordinary course it will be subjected and thus the cover will no longer register with the casing. An important advantage of having the removable cover and the casing body overlap at both the inner periphery and the outer periphery, and providing locking means at both, is that aside from the strength due to overlapping the cover cannot be pried or sprung either at the inside or outside periphery; whereas with locking means at the outer periphery only, for example, the cover can be sprung open and swung on the locking means.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A carrier for spare tires, including an annular casing body open at the front, an annular detachable cover therefor, said body and cover forming jointly a tubular holder adapted to receive a tire, and supporting means for said holder comprising a cross bar of angle iron disposed within said body, one flange of said bar projecting beyond the other flange at the ends of the body and bent to lie against the body, said ends being rigidly secured to said body, and a base connected with said cross bar and having means whereby to secure the same to an automobile spring.

2. A carrier for spare tires, including an annular casing body, adapted to be fixedly secured on an automobile, an annular cover wholly detachable from the casing, the cover and casing overlapping at both the inner and outer periphery, a bayonet lock at one periphery to engage the cover with the casing by a relative turning movement following a relative axial movement, coacting means on the casing and cover at the other periphery adapted to register when the bayonet lock is engaged, and means to lock said coacting elements to prevent turning of the casing relatively to the cover.

3. A carrier for spare tires, including an annular casing body adapted to be fixedly secured on an automobile, and an annular cover entirely detachable from said casing, mating locking elements on the casing and cover at the inner periphery, engageable by a relative turning movement of the cover following a relative axial movement thereof to engage the casing, and means at the outer periphery of the carrier to lock the cover to the casing.

ALBERT E. FELDMAN.